INVENTORS
WALTER HANS DÜRR
BERNHARD E. STRITTMATTER
By Walter Becker

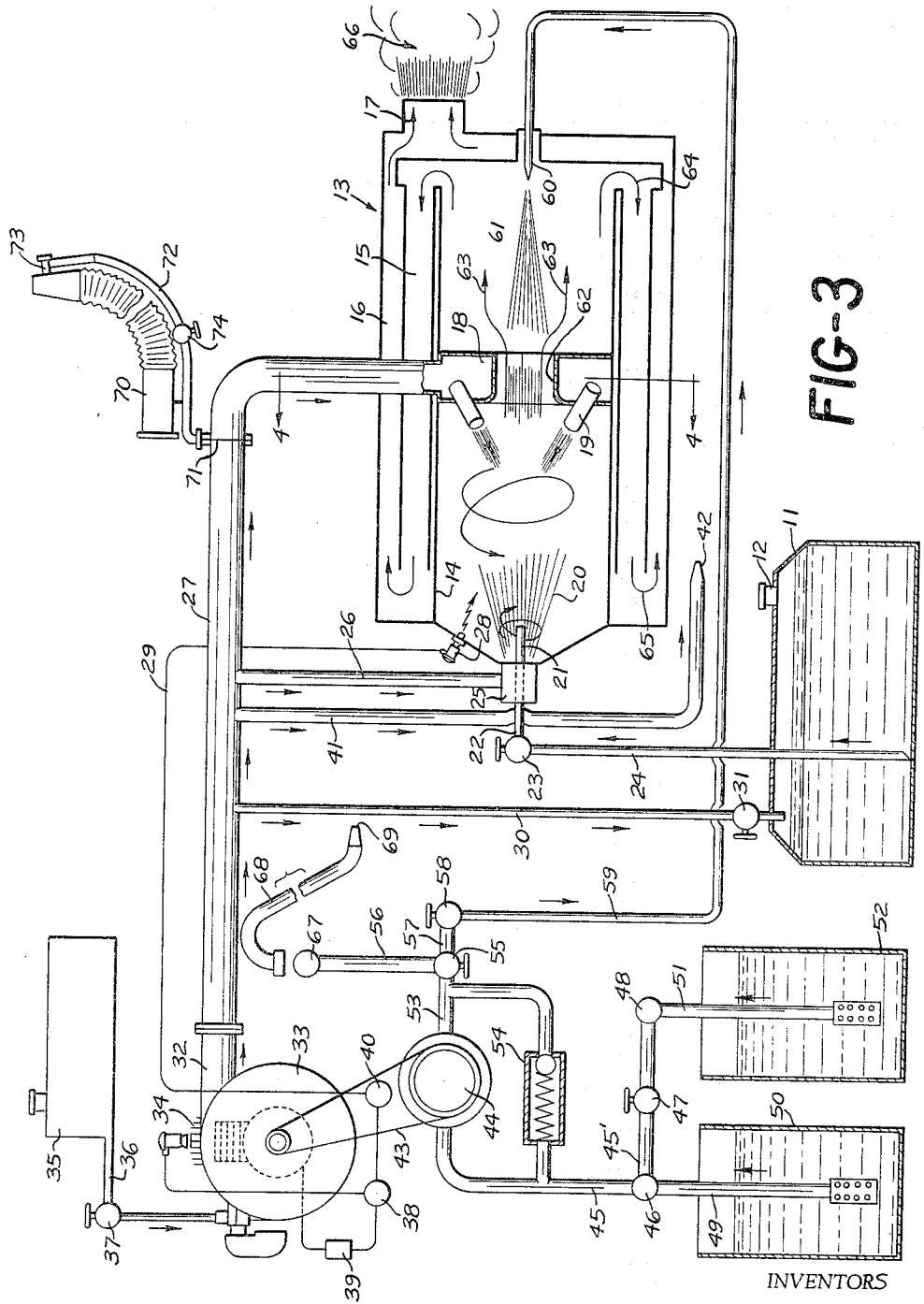

April 5, 1966 W. H. DÜRR ETAL 3,244,641
APPARATUS FOR PRODUCING SMOKE OR FOG
Filed Jan. 23, 1963 4 Sheets-Sheet 3

INVENTORS
WALTER HANS DÜRR
BERNHARD E. STRITTMATTER
By

April 5, 1966 W. H. DÜRR ETAL 3,244,641
APPARATUS FOR PRODUCING SMOKE OR FOG
Filed Jan. 23, 1963 4 Sheets-Sheet 4

INVENTORS
WALTER HANS DÜRR
BERNHARD E. STRITTMATTER

United States Patent Office 3,244,641
Patented Apr. 5, 1966

3,244,641
APPARATUS FOR PRODUCING SMOKE OR FOG
Walter Hans Dürr, Isny, Allgau, and Bernhard E. Strittmatter, Nussdorf (Bodensee), Germany, assignors to Heizmotoren Gesellschaft m.b.H., Uberlingen (Bodensee), Germany
Filed Jan. 23, 1963, Ser. No. 253,451
Claims priority, application Germany, May 24, 1957, M 34,288; Apr. 25, 1958, M 37,463
16 Claims. (Cl. 252—359)

This application is a continuation-in-part of Serial No. 737,442 filed May 2, 1958, now abandoned.

The present invention relates to a method and apparatus for producing smoke, fog or vapor clouds for the purpose of the control of insect pests and the like and for treating vegetation and the like with treatment materials such as fungicides and for frost protection. More particularly still, the present invention relates to a generator for creating a smoke or fog condition which can contain an insecticide or fungicide, for example, and which is readily portable and completely self-contained.

The treatment of vegetation by a fine spray or treatment liquid is known and this is often accomplished by atomizing the liquid to be sprayed and conveying it with an air blast to the treatment region. There are practical limits in connection with an arrangement of this type, however, with respect to the degree to which the liquid can be atomized and what occurs is that even under the highest pressure, the droplets of liquid are still of a substantial size and they tend to agglomerate and thus do not carry as far as could be desired and do not have the penetrating effect that is desired. The more nearly such treatment mist or vapor approaches the actual smoke or vapor condition in which the particles being conveyed by the gas are extremely fine, the more nearly complete the treatment of the vegetation will be.

It has heretofore been proposed, with the foregoing in mind, to use spraying devices in which a smoke-like or fog-like cloud of vapor is produced by introducing the liquid to be sprayed into the exhaust muffler of an internal combustion engine that may form a part of the spraying device. The available heat in this case, however, is insufficient for properly vaporizing certain liquids and is ordinarily insufficient for vaporizing any substantial amount of liquid.

Other known generators have a combustion chamber into which fuel is delivered and burned and the hot combustion gases therefrom have injected therein the liquid agent which it is desired to convert into smoke. This construction, however, is quite complicated and expensive and, while a fog-like or smoke-like vapor cloud is created, the device is of a special nature and is not susceptible for use as a spraying device.

With the foregoing in mind, the present invention has as a primary object the provision of a method and apparatus for producing a strong, dense, visible and penetrating cloud of smoke-like or fog-like vapor from a liquid agent for the purpose of controlling pests or disease or for frost protection in connection with vegetation.

Still another object is the provision of a device as referred to which is relatively simple and which can be employed also as a spraying device.

A still further object is the provision of a device of the nature referred to which can be selectively employed for spraying liquid or a fine mist or which can be employed as a smoke or vapor generator.

Another particular object of the present invention is the provision of a device whereby a strong spray can be created while at the same time the device incorporates a relatively simple and inexpensive smoke generator arrangement.

It is a still further object of the present invention to provide a smoke generator of the nature referred to having a combustion chamber in which the outer walls of the combustion chamber are maintained cool at all times so that no dangerous condition is created.

A still further object of this invention is the provision of a generator of the nature referred to that can either be used alone or in combination with a spraying device and which is sufficiently small that it can readily be moved about to any desired location.

Another particular object of the present invention is the provision of a generator for a smoke-like or a fog-like vapor cloud of liquid treating agent which includes an arrangement for adjusting the humidity of the generated smoke.

The foregoing objects, in brief, are achieved by providing an arrangement with a combustion chamber which communicates with an air blast conduit and within which combustion chamber there is an injection nozzle from which the liquid to be converted into smoke is introduced into the combustion chamber. An outlet channel leads from the combustion chamber to an orifice from which the smoke issues and which smoke is conveyed by the aforementioned air blast.

The apparatus according to this invention includes means for creating turbulence within the combustion chamber in the region where the liquid treatment agent is added so that the treatment agent becomes thoroughly admixed with the combustion gases.

In a preferred embodiment of the present invention the liquid agent is introduced into the chamber in a direction opposite to the direction of flow of the gases leaving the combustion chamber and the air that is introduced into the combustion chamber.

The several objects and advantages referred to above as well as still other objects and advantages of the present invention will become more apparent upon reference to the following specification, taken in connection with the accompanying drawings in which:

FIGURE 3 is a somewhat diagrammatic representation of the entire mechanism according to the modification of FIGURES 1 and 2.

*General arrangement*

Figure 1:
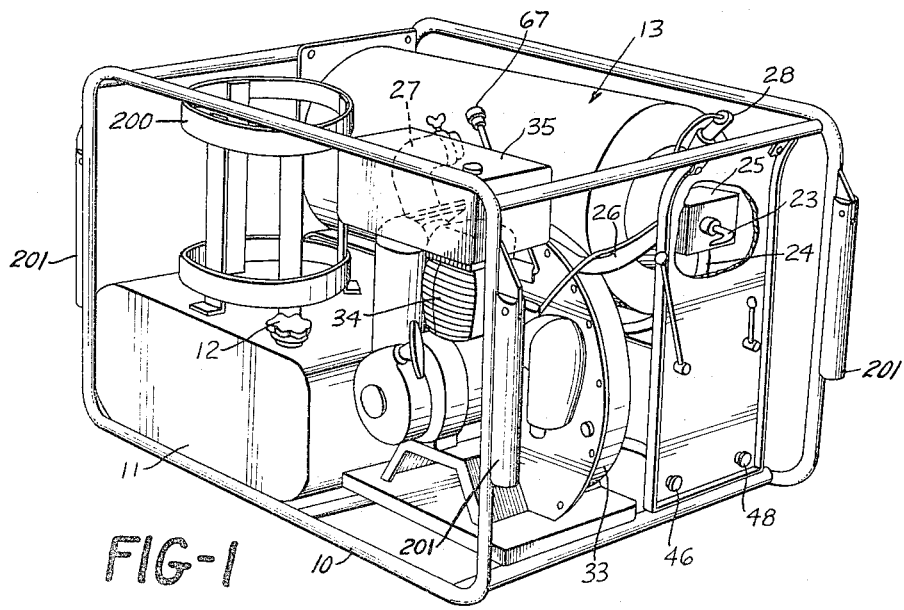
FIGURES 1 and 2 are perspective views showing a generator according to the present invention.

A generator according to the present invention comprises a combustion chamber into which combustible fuel and air is introduced on the axis thereof at the inlet end and ignited so that a continuous blast is maintained therein. The chamber has a discharge from the other or discharge end.

At one or more points spaced longitudinally of the combustion chamber from the point at which the aforementioned combustion takes place, secondary air in substantial volume is introduced into the combustion chamber about the peripheral portion thereof and this air may be introduced in a tangential direction so that a swirling or circular rotary movement is set up within the chamber.

On the opposite side of the point of introduction of the air from the point of combustion, there is introduced into the chamber on the axis thereof a liquid agent, preferably in the form of a relatively fine spray. This liquid agent may be introduced in the direction of flow of the combustion gases or it may be introduced in the opposite direction. In either case, the liquid agent is subjected to the high heat of the combustion gases and it is completely vaporized and the resulting mixture is dense smoke or fog-like cloud. This cloud is conveyed from the chamber through the outlet and forms the treatment gas that is delivered to the region to be treated.

In addition to the aforementioned treatment liquid, water in the form of a mist can also be introduced in the combustion chamber and this will provide for a wet or damp smoke which may be of considerable benefit under certain circumstances.

The arrangement of the present invention can be, and preferably, is entirely self-contained, including its own blower and igniter and its own pumping arrangement for delivering the treatment liquid or treatment liquid and water to the combustion chamber, or it may be arranged so that the air blast is delivered thereto separately and even the fuel and treatment liquid could be delivered thereto separately. As mentioned, however, the preferred arrangement of the present invention is an entirely self-contained unit, carrying its own fuel and to which it is only necessary to supply the treatment liquid, and water, when the latter is used.

Referring now, more particularly to the drawings, and especially to FIGURES 1 through 4, the preferred generator arrangement shown therein comprises an outer tubular enclosing metal frame part 10 within which all of the components of the generator are mounted. These components comprise a tank 11 for the fuel that is supplied to the combustion chamber. This tank is provided with a filling cap 12 which, when it is placed on the tank, completely seals the tank so that the tank can be subjected to pressure, as will be explained hereinafter, thereby to force the fuel therein to the combustion chamber.

Also mounted within the frame is a unit generally designated at 13 which comprises an inner combustion chamber 14, a series of axially extending pipes or an annular chamber 15 surrounding the combustion chamber, and communicating therewith at the one end and an outer annular chamber 16 that communicates at one end with one end of chamber 15 while, at its other end, outer chamber 16 terminates in a discharge opening 17 for the generated smoke which is discharged from the said outlet.

In the region of the center of the combustion chamber there is a circular manifold 18 having a plurality of air discharge pipes or nozzles 19 arranged therein so that the nozzles project air from the manifold substantially tangentially into the combustion chamber and in a direction somewhat inclined toward the burner end of the chamber. The aforementioned burner or inlet end of the combustion chamber is indicated at 20 and constitutes a fuel nozzle means 21 connected to a conduit 22 that leads through a valve 23 to a conduit 24 that extends downwardly into tank 11.

Surrounding the conduit 22 is an air supply chamber 25 that supplies air into the burner or inlet end of the combustion chamber and connected to chamber 25 is an air supply pipe 26 leading to a main air supply conduit 27.

An igniter in the form of a spark plug or the like at 28 is mounted, in the end wall of the combustion chamber for igniting the fuel supplied thereto. The igniter is electrically operable and is supplied with electrical energy by way of wire 29.

Also connected with main air supply conduit 27 and leading downwardly into tank 11 at the extreme top thereof is a branch conduit 30 having a control valve 31 therein. This conduit supplies pressure to tank 11 which forces fuel therefrom through conduit 24, valve 23, and conduit 22 and fuel nozzle means 21 into the combustion chamber.

The aforementioned main air supply conduit 27 is connected to the manifold 18 in the combustion chamber and this forms the principal discharge point from the main air supply conduit. At its other end the main air supply conduit is connected with outlet 32 of a blower 33 which is driven by the internal combustion engine 34. This engine is supplied with fuel from fuel tank 35 by fuel supply conduit 36 that includes a shut off valve 37.

The said engine has an ignition system including an ignition coil 38 and interrupter 39 and this interrupter is also operable for controlling a coil 40 that is connected to wire 29 for supplying electrical energy to the previously mentioned igniter 28.

A still further branch conduit 41 leads from main air supply conduit 27 to a nozzle 42 which discharges a blast of air between the combustion chamber and fuel tank 11 in order to keep the fuel tank cool as a safety measure.

While the several branch conduits 26, 30 and 41 have been described as branching off from main air supply conduit 27 as illustrated in the diagrammatic view, FIGURE 3, it will be understood that these branch conduits could be, and usually are, in at least some cases, taken off from the periphery of the lower housing 33 when convenience indicates that this is the preferable way to make these connections.

The internal combustion engine 34 is connected by a drive element such as a belt or chain 43 with a pump 44 which is preferably of the rotary piston type so that the pump can develop a high pressure on liquid supplied thereto.

The inlet side of the pump is connected by conduit 45 to a connector element 46 and conduit 45 also has a branch 45' leading through a control valve 47 to a second connector element 48. Connector element 46 is adapted for receiving the end of a conduit 49, usually a flexible conduit, that leads to a container 50 containing the treatment liquid that is to be vaporized to form the smoke cloud developed by the generator.

The other connector element 48 similarly is adapted for connection with a conduit 51, also usually a flexible conduit, that leads to a container 52 containing water so that water can be supplied to conduit 45 in accordance with the adjustment of valve 47.

The discharge side of pump 44 is connected to conduit 53. A relief valve 54 by-passes the pump to relieve conduit 53 of excessive pressures.

Conduit 53 is connected to a valve 55 from which leads the conduits 56 and 57, the latter conduit communicating through a valve 58 with a conduit 59. Valve 55 is operable to connect conduit 53 with one or the other of the conduits 56 and 57.

Conduit 59 leads to the opposite or discharge end of the combustion chamber from the fuel nozzle 21 and terminates in a nozzle 60 so that a fine mist of the treatment liquid is sprayed into the combustion chamber in a direction opposite to the direction of the combustion gases passing from the burner end of the chamber toward the outlet end thereof.

This spray is indicated at 61 while the combustion gases leaving the combustion chamber and passing through the center opening 62 in manifold 18 are indicated by arrows 63. These combustion gases pick up the mist of treatment liquid and convert it into vapor and the vapor becomes thoroughly admixed with the combustion gases and is then conveyed thereby, as indicated by the arrows 64 into the pipes or annular chamber 15 in which the mixture flows backwardly along the outside of the combustion chamber toward the burner end thereof and then is delivered into outer annular chamber 16, as indicated by the arrows 65, and then again flows rightwardly along the outside of the device to the discharge opening 17 whence it leaves in the form of a dense cloud as indicated at 66.

The aforementioned conduit 56 leads to a connector element 67 which is adapted for connection with a flexible hose 68 terminating in a nozzle 69. When the hose 68 is employed, valve 58 may be closed while valve 55 is adjusted to direct the liquid pumped by pump 44 into conduit 56 so that a stream of liquid under pressure can be delivered from nozzle 69 for drenching vegetation when so desired. The nozzle can also be selected to form a mist if desired.

When the aforementioned operation is carried out, the combustion chamber is, of course, idle and no smoke cloud is generated by the device.

A still further manner in which the device can be used employs a flexible air conduit 70 which is adapted for connection of the main air supply conduit 27 by disconnecting the latter from the manifold 18. This can be done, for example, by the provision of a joint in the air supply conduit as indicated at 71.

Associated with the flexible conduit 70 is a smaller liquid conduit 72 having nozzle means 73 at one end which supplies a mist or atomized liquid to the air stream passing through conduit 70. At its other end conduit 72 is adapted for connection with the aforementioned connector element 67 for liquid to be supplied thereto by pump 44. A control valve 74 is conveniently located in conduit 72 for controlling the rate of liquid flow therethrough.

When the conduit 70 is employed for conveying the blast from the blower and the conduit 72 is connected to receive the liquid from pump 44, there is, of course, no flame in the combustion chamber and no smoke is generated in the device. Under the circumstances referred to there is instead a more normal and conventional spraying operation carried out with fine droplets or a fine mist of the treatment liquid being injected into an air blast and conveyed thereby to the area to be treated.

Figure 5:
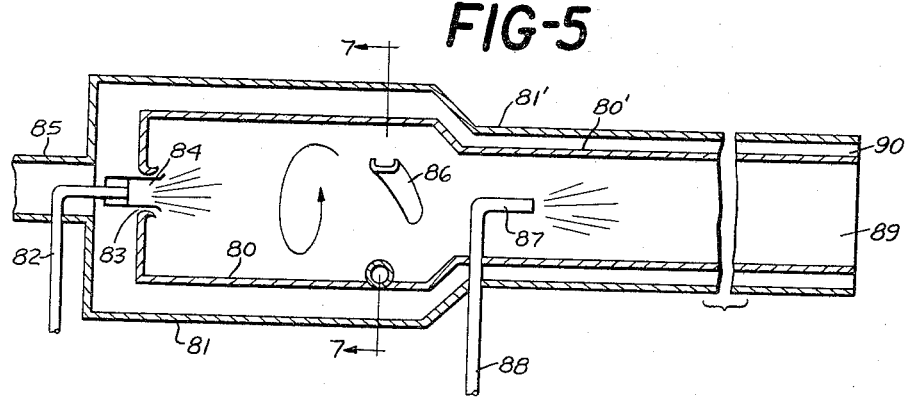
FIGURE 5 is a somewhat diagrammatic longitudinal section through a modified form which a smoke generator according to the present invention can take.

*Modification of FIGURE 5*

In the arrangement of FIGURE 5 there is a generally cylindrical inner chamber 80 which is surrounded by somewhat larger cylindrical chamber 81. Projecting into the left or inlet end of chamber 80 is a fuel supply pipe 82 and surrounding the fuel pipe is an annular space 83 through which air is supplied to the left end of chamber 80. The fuel supply conduit 82 terminates in a nozzle portion 84 so that combustion can be maintained in the left end of chamber 80.

Chamber 81 has a conduit 85 connected thereto by means of which air under pressure is supplied to the space between inner chamber 80 and outer chamber 81. Toward the right end of inner chamber 80 there are a plurality of generally tangentially directed air inlet openings 86 and which openings are also inclined toward the fuel nozzle so that air passes from the space between chambers 80 and 81 through these inlets and sets up a swirling movement within the chamber.

Immediately rightwardly of the air inlets 86, the chambers 80 and 81 taper inwardly to reduced diameter portions 80' and 80", respectively. Within the portion 80' there is a nozzle 87 which is supplied with treatment liquid by way of a conduit 88. The liquid is sprayed into the reduced diameter portion 80' and is picked up by the combustion gases and the air which is admixed therewith and the heat of this mixture of gases thoroughly vaporizes the treatment liquid being sprayed from nozzle 87 and the entire mixture converts into a dense cloud of smoke that passes rightwardly through reduced diameter chamber 80' and issues from the discharge end 89 thereof. Simultaneously, an enveloping blast of air discharges from the annular opening 90 between walls of chambers 80' and 81"; and this assists in directing and conveying the smoke cloud to the treatment region.

Figure 6:
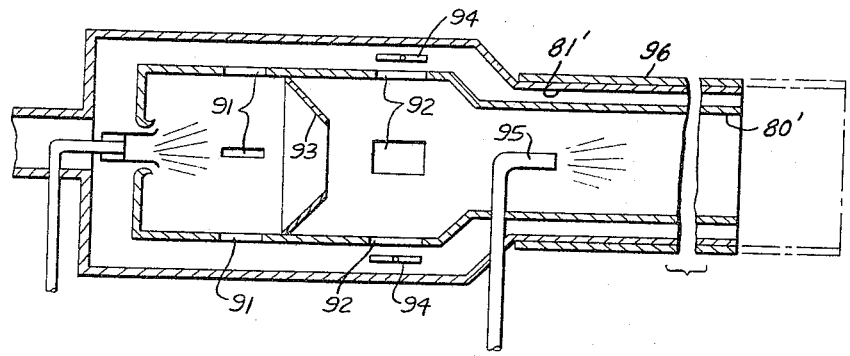
FIGURE 6 is a somewhat diagrammatic longitudinal section similar to FIGURE 5 but showing another modification.
Figures 4, 7:
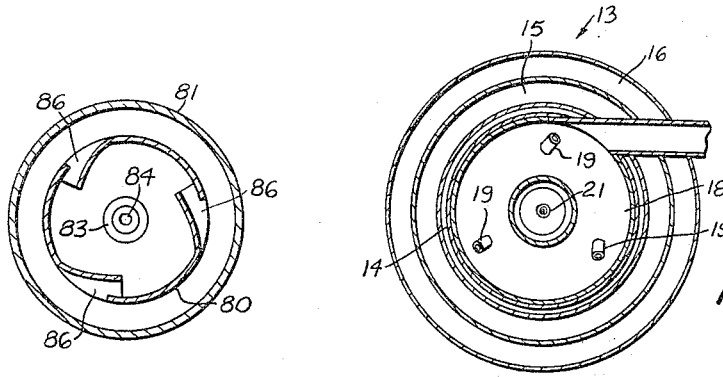
FIGURE 4 is a transverse cross-section indicated by line 4—4 on FIGURE 3, and showing the manifold by means of which secondary air is introduced into the combustion chamber.
FIGURE 7 is a transverse sectional view indicated by line 7—7 on FIGURE 5.

The nature of the air inlet means 86 will be seen in the cross-section view, FIGURE 6.

*Modification of FIGURE 6*

FIGURE 6 shows a modification which is similar to the modification of FIGURE 5 and wherein similar parts are similarly numbered but this modification differs from that of FIGURE 5 in that additional air inlets are provided at 91 between the region of combustion and the main secondary air inlets 92. Positioned between the aforementioned inlets is a frusto-conical element 93.

Associated with the air inlets 92 there may be the adjustable valve elements 94 which are turnable on central supporting axes for varying the amount of air introduced through the inlets 92.

The FIGURE 6 modification also has an outer sleeve element 96 mounted on the outside of the reduced diameter portion 81' of the outer chamber and which is longitudinally adjustable for changing the characteristics of the discharge of the device.

In all of the modifications, the secondary air introduced assists in complete combustion of the fuel and, on account of the swirling of the air in the chamber, tends to cool the outside of the combustion chamber while creating intense heat along the axis of the chamber so the treatment liquid injected on the axis of the chamber will be completely vaporized. By accurately adjusting the fuel air ratio to provide for exactly complete combustion, thereby substantially eliminating oxygen from the gas, the treatment liquid will not be oxidized when it is of a type where this might occur.

When the treatment liquid is heat sensitive, the secondary air, particularly where secondary air is introduced in two places along the chamber, may cool the combustion gases to a point where the treatment liquid will not be damaged by the heat.

Figure 2:
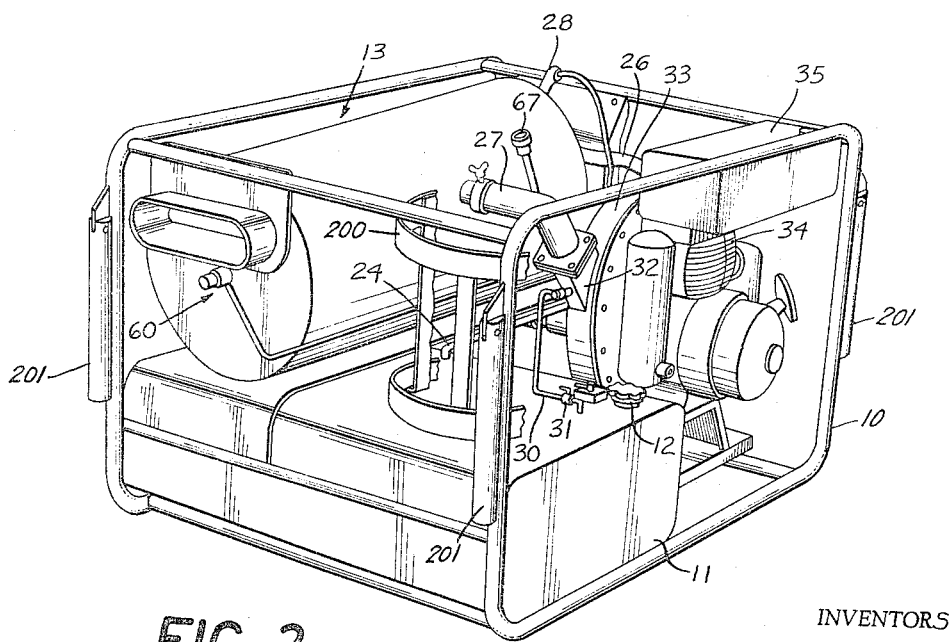

Considering the modification of FIGURES 1 through 3, it will be noted that within the framework of the machine and positioned over tank 11 is a cage indicated by reference numeral 200 and which cage is adapted for receiving and retaining the air blast hose and the liquid conduits that are employed when spraying is carried out without operating the combustion chamber. This forms an extremely convenient arrangement with all of the device and the appurtenances thereto required for the various types of operation of the device entirely self-contained.

In FIGURE 1 it will be observed that the vertical end members of the tubular frame 10 of the device are provided with pivoted hand grip members 201 which can be swung upwardly from the position in which they are illustrated in order to provide hand graspable means whereby the unit can be picked up by two or more persons and conveyed from one place to another.

*Operation*

It is believed that it will be evident from the preceding description of the structure of the device the manner in which it operates. In brief, combustion is maintained in one end of the combustion chamber and the combustion gases move from the burner toward the discharge end of the chamber and during the movement of the gases toward the discharge end secondary air is introduced into the chamber in a rotary direction so that the blast tends to be contained along the axis of the chamber while the outer portion of the chamber is cooled. Subsequently to the condition of the secondary air the combustion gases and the air admixed therewith pick up the liquid treatment material and the heat of the blast converts this material into fog or smoke and, on account of the agitation in the combustion gases on account of the tangential introduction of the air into the chamber, the smoke or fog becomes completely admixed with the gases and air and by the time the gases and air and entrained treatment liquid issues from the exhaust discharge of the device, a dense cloud is formed which is conveyed to the treatment region.

In at least one of the modifications, the cloud is surrounded by a blast of air from the blower and this assists in directing the cloud toward the treatment region.

The device is adapted for selective operation either for spraying liquids, or for spraying a fine mist entrained in an air blast. In either of the last mentioned cases, the burner is not operated because no fog or smoke is being created in the machine.

Figure 8:
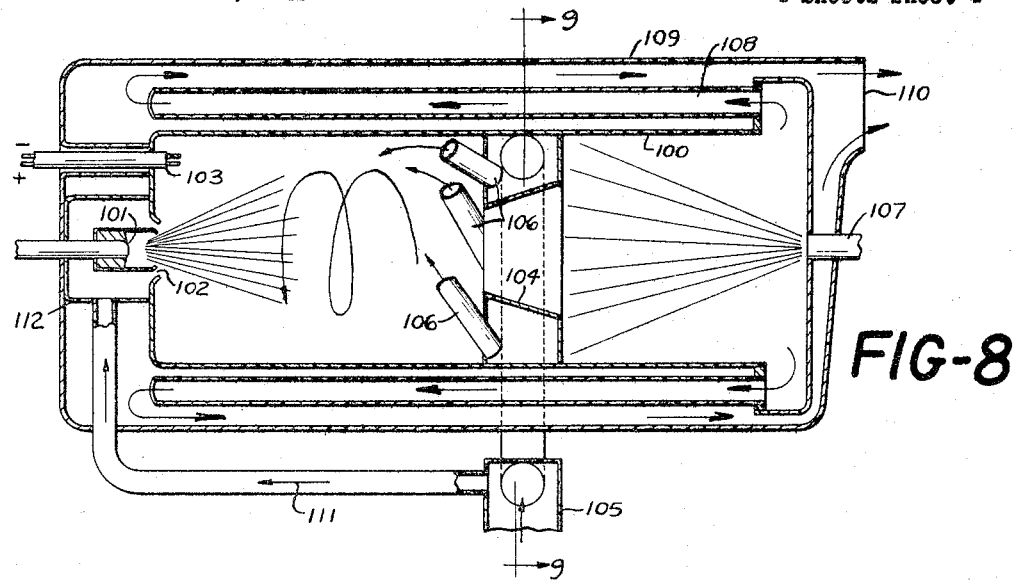
FIGURE 8 is a somewhat diagrammatic section through a device similar to what is shown in FIGURE 3.
Figure 9:
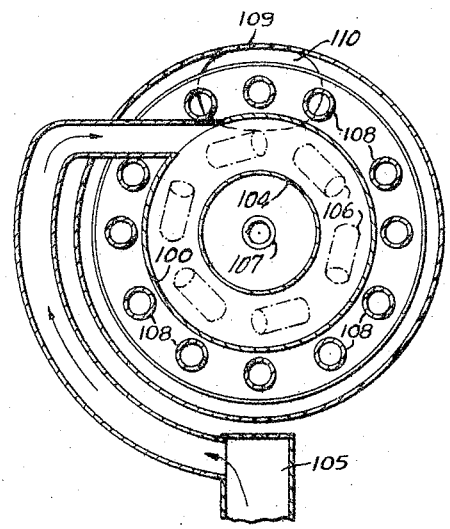
FIGURE 9 is a cross section on line 9—9 of FIGURE 8.

In FIGURES 8 and 9, the chamber 100 has fuel nozzle 101 at the inlet end with annular air channel 102 surrounding the nozzle. Igniter 103 is positioned adjacent the fuel nozzle.

Manifold 104 is supplied with air by conduit 105 and has discharge conduits 106 inclined toward the nozzle 101 and directed tangentially.

At the discharge end of the chamber 100 is a nozzle means 107 for spraying fog or smoke creating material along the axis of the chamber toward the fuel nozzle. The discharge end of the chamber communicates with conduit means 108 which lead backwardly along the outside of the chamber and discharge at the rear into casing 109, casing 109 has a discharge 110 where the smoke or fog is ejected.

A conduit 111 branching off from conduit 105 leads to casing element 112 to provide air to blast through channel 102 to pick up the fuel from the nozzle and to create a hot blast moving toward the open end of the chamber.

FIGURE 9 shows how the manifold establishes a restriction in the chamber between the point of injection of fuel and the point of injection of the fog or smoke creating material.

Figure 10:
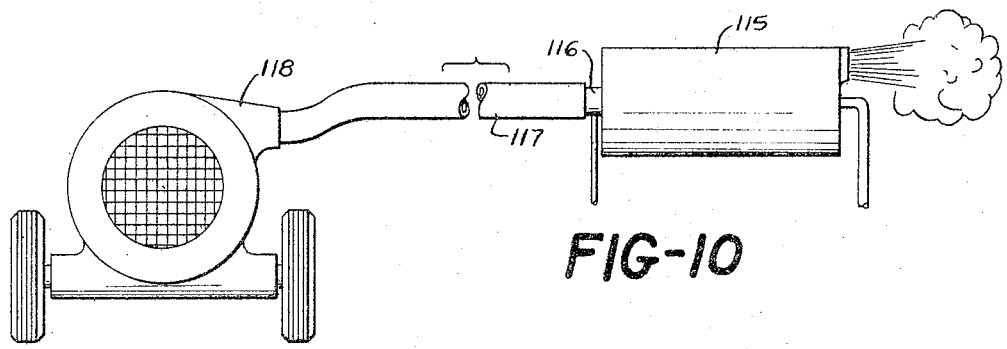
FIGURE 10 is a diagrammatic view showing how a separate blower could be used with a device according to the present invention.

FIGURE 10 shows how a generator 115 can be provided with a conduit 116 for connection to a hose 117 leading from a blower 118 so the device can be used with an entirely independent source of air, such as a spray machine or the like.

It will be understood that this invention is susceptible to modification in order to adapt it to different usages and conditions and accordingly it is desired to comprehend such modifications within this invention as may fall within the scope of the appended claims.

We claim:

1. In a fog or smoke generator; a generally tubular wall means defining a chamber having an inlet end and a discharge end, a fuel nozzle on the axis of said chamber at the inlet end to spray fuel axially directly into the chamber, channel means in said inlet end of the chamber for supplying air axially directly into said chamber around the fuel nozzle and causing combustion of the fuel to create a hot blast moving toward the discharge end of the chamber, nozzle means on the chamber axis for supplying a fog or smoke creating material to the chamber on the axis thereof at a point spaced from said fuel nozzle so the material is entrained in the hot blast to generate fog or smoke, the thus generated fog or smoke passing out the discharge end of said chamber, means projecting inwardly from the outer wall of said chamber and forming a restriction in said chamber between said fuel nozzle and nozzle means, and means for introducing secondary air into said chamber about the periphery thereof between said fuel nozzle and said restriction and in a direction substantially tangentially of the chamber and inclined toward said fuel nozzle.

2. In a fog or smoke generator; a generally tubular wall means defining a chamber having an inlet end and a discharge end, a fuel nozzle on the axis of said chamber at the inlet end to spray fuel axially directly into the chamber, channel means in said inlet end of the chamber for supplying air axially directly into said chamber around the fuel nozzle and causing combustion of the fuel to create a hot blast moving toward the discharge end of the chamber, nozzle means on the chamber axis for supplying a fog or smoke creating material to the chamber on the axis thereof at a point spaced from said fuel nozzle so the material is entrained in the hot blast to generate fog or smoke, the thus generated fog or smoke passing out the discharge end of said chamber, annular means in the chamber between the fuel nozzle and the nozzle means extending from the outer periphery of the chamber toward the axis thereof defining a central aperture in the chamber through which the hot blast passes, and means for introducing secondary air through said annular means into said chamber between said fuel nozzle and said central aperture and in a direction substantially tangentially of the chamber and inclined toward said fuel nozzle.

3. In a fog or smoke generator; a generally tubular wall means defining a chamber having an inlet end and a discharge end, a fuel nozzle on the axis of said chamber at the inlet end to spray fuel axially into the chamber, channel means in said inlet end of the chamber for supplying air axially into said chamber around the fuel nozzle and causing combustion of the fuel to create a hot blast moving toward the discharge end of the chamber, nozzle means on the chamber axis for supplying a fog or smoke creating material to the chamber on the axis thereof at a point spaced from said fuel nozzle so the material is entrained in the hot blast to generate fog or smoke, the thus generated fog or smoke passing out the discharge end of said chamber, a truncated cone element in the chamber between the fuel nozzle and the nozzle means defining a central aperture in the chamber through which the hot blast passes, and means for introducing secondary air into said chamber between said fuel nozzle and said nozzle means.

4. In a fog or smoke generator; a generally tubular wall means defining a chamber having an inlet end and a discharge end, a fuel nozzle on the axis of said chamber at the inlet end to spray fuel axially into the chamber, channel means in said inlet end of the chamber for supplying air axially into said chamber around the fuel nozzle and causing combustion of the fuel to create a hot blast moving toward the discharge end of the chamber, nozzle means on the chamber axis for supplying a fog or smoke creating material to the chamber on the axis thereof at a point spaced from said fuel nozzle so the material is entrained in the hot blast to generate fog or smoke, the thus generated fog or smoke passing out the discharge end of said chamber, a truncated cone element in the chamber between the fuel nozzle and the nozzle means defining a central aperture in the chamber through which the hot blast passes, and means for introducing secondary air into said chamber at the periphery thereof between said fuel nozzle and said nozzle means, on both sides of said cone element.

5. The arrangement according to claim 5 in which means are provided to control the amount of secondary air introduced into the chamber between said cone element and said nozzle means.

6. In a fog or smoke generator; a generally tubular wall means defining a chamber having an inlet end and a discharge end, said chamber being unobstructed in the central axial portion from end to end thereof, a fuel nozzle on the axis of said chamber at the inlet end thereof opposite the discharge end to spray fuel axially directly into the chamber, channel means in said inlet end of the chamber for supplying air axially directly into said chamber around the fuel nozzle and causing combustion of the fuel to create a hot blast moving toward the discharge end of the chamber, nozzle means on the chamber axis for supplying a fog or smoke creating material to the chamber on the axis thereof at a point spaced from said fuel nozzle so the material is entrained in the hot blast to generate fog or smoke, the thus generated fog or smoke passing out the discharge end of said chamber, annular means in the chamber between the fuel nozzle and the nozzle means extending from the outer periphery of the chamber toward the axis thereof defining a central aperture in the chamber through which the hot blast passes, and means for introducing secondary air into said chamber between said fuel nozzle and said nozzle means, said annular means comprising an air manifold, and said means for introducing secondary air comprising conduit means carried by said manifold and connecting the manifold with the chamber.

7. In a fog or smoke generator; a generally tubular wall means defining a chamber having an inlet end and a discharge end, said chamber being unobstructed in the central axial portion from end to end thereof, a fuel nozzle on the axis of said chamber at the inlet end thereof opposite the discharge end to spray fuel axially directly into the chamber, channel means in said inlet end of the chamber for supplying air axially directly into said chamber around the fuel nozzle and causing combustion of the fuel to create a hot blast moving toward the discharge end of the chamber, nozzle means on the chamber axis for supplying a fog or smoke creating material to the chamber on the axis thereof at a point spaced from said fuel nozzle so the material is entrained in the hot blast to generate fog or smoke, the thus generated fog or smoke passing out the discharge end of said chamber, annular means in the chamber between the fuel nozzle and the nozzle means extending from the outer periphery of the chamber toward the axis thereof defining a central aperture in the chamber through which the hot blast passes, and means for introducing secondary air into said chamber between said fuel nozzle and the said nozzle means, said annular means comprising an air manifold, and said means for introducing secondary air comprising conduit means carried by said manifold and connecting the manifold with the chamber, said conduit means comprising a plurality of substantially tangentially directed conduits.

8. In a fog or smoke generator; a generally tubular wall means defining a chamber open at one end, a fuel nozzle on the axis of said chamber at the other end to spray fuel axially into the chamber, channel means in said other end of the chamber for supplying air axially into said chamber around the fuel nozzle and causing combustion of the fuel to create a hot blast moving toward the open end of the chamber, nozzle means on the chamber axis for supplying a fog or smoke creating material to the chamber on the axis thereof at a point spaced from said fuel nozzle so the material is entrained in the hot blast to generate fog or smoke, the thus generated fog or smoke passing out the open end of said chamber, annular means in the chamber between the fuel nozzle and the nozzle means extending from the outer periphery of the chamber toward the axis thereof defining a central aperture in the chamber through which the hot blast passes, and means for introducing secondary air into said chamber between said fuel nozzle and the said nozzle means, said annular means comprising an air manifold, and said means for introducing secondary air comprising conduit means carried by said manifold and connecting the manifold with the chamber, said conduit means comprising a plurality of substantially tangentially directed conduits, said conduits being inclined toward said fuel nozzle.

9. In a fog or smoke generator; a generally tubular wall means defining a chamber open at one end, a fuel nozzle on the axis of said chamber at the other end to spray fuel axially into the chamber, channel means in said other end of the chamber for supplying air axially into said chamber around the fuel nozzle and causing combustion of the fuel to create a hot blast moving toward the open end of the chamber, nozzle means on the chamber axis for supplying a fog or smoke creating material to the chamber on the axis thereof at a point spaced from said fuel nozzle so the material is entrained in the hot blast to generate fog or smoke, the thus generated fog or smoke passing out the open end of said chamber, and means for introducing secondary air into said chamber in a substantially tangential direction about the periphery thereof between said fuel nozzle and said nozzle means, said chamber having a step therein between the fuel nozzle and the nozzle means and having its larger diameter at the fuel nozzle end.

10. In a fog or smoke generator; a generally tubular wall means defining a chamber open at one end, a fuel nozzle on the axis of said chamber at the other end thereof to spray fuel axially into the chamber, channel means in said other end of the chamber for supplying air axially into said chamber around the fuel nozzle and causing combustion of the fuel to create a hot blast moving toward the open end of the chamber, nozzle means on the chamber axis for supplying a fog or smoke creating material to the chamber on the axis thereof at a point spaced from said fuel nozzle so the material is entrained in the hot blast to generate fog or smoke, the thus generated fog or smoke passing out the open end of said chamber, means for introducing secondary air into said chamber in a substantially tangential direction about the periphery thereof between said fuel nozzle and said nozzle means, conduit means extending axially of the chamber on the outside and communicating at the one end which is adjacent the open end of the chamber with said open end to receive gases therefrom, a closure member extending over the open end of said chamber and the said one end of said conduit means and directing the entire gas flow from said open end of the chamber into said conduit means, a casing surrounding said chamber and said conduit means and closed at the said other end of said chamber and having outlet means therein at the other end, said conduit means terminating at the other end thereof opposite said one end short of the closed end of said casing and discharging from the said other end thereof into said casing.

11. In a fog or smoke generator; a generally tubular wall means defining a chamber open at one end, a fuel nozzle on the axis of said chamber at the other end to spray fuel axially into the chamber, channel means in said other end of the chamber for supplying air axially into said chamber around the fuel nozzle and causing combustion of the fuel to create a hot blast moving toward the open end of the chamber, nozzle means on the chamber axis for supplying a fog or smoke creating material to the chamber on the axis thereof at a point spaced from said fuel nozzle so the material is entrained in the hot blast to generate fog or smoke, the thus generated fog or smoke passing out the open end of said chamber, and means for introducing secondary air into said chamber in a substantially tangential direction about the periphery thereof between said fuel nozzle and said nozzle means, said nozzle means being arranged to inject said material along the axis of the chamber toward said fuel nozzle.

12. In a portable fog or smoke generator; a generally tubular wall means defining a chamber open at one end, a fuel nozzle on the axis of said chamber at the other end to spray fuel axially into the chamber, channel means in said other end of the chamber for supplying air axially into said chamber around the fuel nozzle and causing combustion of the fuel to create a hot blast moving toward the open end of the chamber, nozzle means on the chamber axis for supplying a fog or smoke creating material to the chamber on the axis thereof at a point spaced from said fuel nozzle so the material is entrained in the hot blast to generate fog or smoke, the thus generated fog or smoke passing out the open end of said chamber, and means for introducing secondary air into said chamber in a substantially tangential direction about the periphery thereof between said fuel nozzle and said nozzle means, said nozzle means being arranged to inject said material along the axis of the chamber toward said fuel nozzle, a skeleton-like frame in which said chamber is mounted with the said open end of the chamber at one end of the frame, fuel supply means in the frame connected to the fuel nozzle, a blower in the frame adapted for connection to supply said secondary air and to supply air to said channel means, an engine in the frame driving the blower, a pump in the frame driven by the engine having its outlet connected to said nozzle means, inlet means on the frame for water and for fog and smoke creating material and connected to the inlet of the pump, an igniter in the chamber adjacent said fuel nozzle, and energizing means for said igniter connected thereto and driven by said engine, said skeleton-like frame enclosing and protecting the entire apparatus.

13. In a portable fog or smoke generator; a generally tubular wall means defining a chamber open at one end, a fuel nozzle on the axis of said chamber at the other end to spray fuel axially into the chamber, channel means in said other end of the chamber for supplying air axially into said chamber around the fuel nozzle and causing combustion of the fuel to create a hot blast moving toward the open end of the chamber, nozzle means on the chamber axis for supplying a fog or smoke creating material to the chamber on the axis thereof at a point spaced from said fuel nozzle so the material is entrained in the hot blast to generate fog or smoke, the thus generated fog or smoke passing out the open end of said chamber, and means for introducing secondary air into said chamber in a substantially tangential direction about the periphery thereof between said fuel nozzle and said nozzle means, said nozzle means being arranged to inject said material along the axis of the chamber toward said fuel nozzle, a skeleton-like frame in which said chamber is mounted with the said open end of the chamber at one end of the frame, fuel supply means in the frame connected to the fuel nozzle, a blower in the frame adapted for connection to supply said secondary air and to supply air to said channel means, an engine in the frame driving the blower, a pump in the frame driven by the engine having its outlet connected to said nozzle means, inlet means on the frame for water and for fog and smoke creating material and connected to the inlet of the pump, an igniter in the chamber adjacent said fuel nozzle, and energizing means for said igniter connected thereto and driven by said engine, said fuel supply means including a tank and a fuel conduit leading from the tank to the fuel nozzle, and a connection from the blower to the tank to supply pressure to the tank to force fuel from the tank to the fuel nozzle, said skeleton-like frame enclosing and protecting the entire apparatus.

14. In a portable fog or smoke generator; a generally tubular wall means defining a chamber open at one end, a fuel nozzle on the axis of said chamber at the other end to spray fuel axially into the chamber, channel means in said other end of the chamber for supplying air axially into said chamber around the fuel nozzle and causing combustion of the fuel to create a hot blast moving toward the open end of the chamber, nozzle means on the chamber axis for supplying a fog or smoke creating material to the chamber on the axis thereof at a point spaced from said fuel nozzle so the material is entrained in the hot blast to generate fog or smoke, the thus generated fog or smoke passing out the open end of said chamber, and means for introducing secondary air into said chamber in a substantially tangential direction about the periphery thereof between said fuel nozzle and said nozzle means, said nozzle means being arranged to inject said material along the axis of the chamber toward said fuel nozzle, a skeleton-like frame in which said chamber is mounted with the said open end of the chamber at one end of the frame, fuel supply means in the frame connected to the fuel nozzle, a blower in the frame adapted for connection to supply said secondary air and to supply air to said channel means, an engine in the frame driving the blower, a pump in the frame driven by the engine having its outlet connected to said nozzle means, inlet means on the frame for water and for fog and smoke creating material and connected to the inlet of the pump, an igniter in the chamber adjacent said fuel nozzle, and energizing means for said igniter connected thereto and driven by said engine, said fuel supply means including a tank and a fuel conduit leading from the tank to the fuel nozzle, and a connection from the blower to the tank to supply pressure to the tank to force fuel from the tank to the fuel nozzle, said tank being beneath said chamber, and a conduit connected to the blower and discharging between the tank and the chamber to cool the tank, said skeleton-like frame enclosing and protecting the entire apparatus.

15. In a portable fog or smoke generator; a generally tubular wall means defining a chamber open at one end, a fuel nozzle on the axis of said chamber at the other end to spray fuel axially into the chamber, channel means in said other end of the chamber for supplying air axially into said chamber around the fuel nozzle and causing combustion of the fuel to create a hot blast moving toward the open end of the chamber, nozzle means on the chamber axis for supplying a fog or smoke creating material to the chamber on the axis thereof at a point spaced from said fuel nozzle so the material is entrained in the hot blast to generate fog or smoke, the thus generated fog or smoke passing out the open end of said chamber, and means for introducing secondary air into said chamber in a substantially tangential direction about the periphery thereof between said fuel nozzle and said nozzle means, said nozzle means being arranged to inject said material along the axis of the chamber toward said fuel nozzle, a skeleton-like frame in which said chamber is mounted with the said open end of the chamber at one end of the frame, fuel supply means in the frame connected to the fuel nozzle, a blower in the frame adapted for connection to supply said secondary air and to supply air to said channel means, an engine in the frame driving the blower, a pump in the frame driven by the engine having its outlet connected to said nozzle means, inlet means on the frame for water and for fog and smoke creating material and connected to the inlet of the pump, an igniter in the chamber adjacent said fuel nozzle, and energizing means for said igniter connected thereto and driven by said engine, said fuel supply means including a tank and a fuel conduit leading from the tank to the fuel nozzle, and a connection from the blower to the tank to supply pressure to the tank to force fuel from the tank to the fuel nozzle, a control panel in the frame, and control valves between said inlet means and said pump and in said fuel conduit and mounted on said panel, said skeleton-like frame enclosing and protecting the entire apparatus.

16. An arrangement according to claim 15 in which said frame includes vertical corner members, and handle means on said corner members for lifting and carrying said arrangement, said handle means being pivotally connected to said corner members on horizontal axis and being foldable downwardly against said corner members.

References Cited by the Examiner

UNITED STATES PATENTS

| | | | |
|---|---|---|---|
| 1,665,267 | 4/1928 | Jernberg | 252—359.1 |
| 1,716,132 | 6/1929 | Hodgkinson. | |
| 1,918,397 | 7/1933 | Jezler. | |
| 2,352,677 | 7/1944 | Anderson et al. | 252—359.1 |
| 2,408,429 | 10/1946 | Levey | 252—359.1 |
| 2,667,459 | 1/1954 | Besler | 252—359.1 |
| 2,780,174 | 2/1957 | Wosika et al. | 103—218 X |
| 2,926,455 | 3/1960 | Morris | 252—359.1 |
| 3,046,973 | 7/1962 | Kofink | 158—4 |

FOREIGN PATENTS

| | | |
|---|---|---|
| 204,869 | 8/1959 | Austria. |
| 299,217 | 10/1928 | Great Britain. |

NORMAN YUDKOFF, *Primary Examiner.*

J. SOFER, *Assistant Examiner.*